United States Patent
Katikala et al.

(10) Patent No.: US 11,885,532 B2
(45) Date of Patent: Jan. 30, 2024

(54) EFFICIENT LIMIT SWITCH DESIGN AND ITS LOCATION IN A GAS FURNACE

(71) Applicant: CARRIER CORPORATION, Palm Beach Gardens, FL (US)

(72) Inventors: Lok Sudhir Katikala, Hyderabad (IN); Ashalatha Kapa, Hyderabad (IN)

(73) Assignee: CARRIER CORPORATION, Palm Beach Gardens, FL (US)

(*) Notice: Subject to any disclaimer, the term of this patent is extended or adjusted under 35 U.S.C. 154(b) by 44 days.

(21) Appl. No.: 17/130,843

(22) Filed: Dec. 22, 2020

(65) Prior Publication Data
US 2021/0215395 A1 Jul. 15, 2021

(30) Foreign Application Priority Data
Jan. 15, 2020 (IN) .............................. 202011001832

(51) Int. Cl.
| | |
|---|---|
| *F24H 9/20* | (2022.01) |
| *G05D 23/185* | (2006.01) |
| *F24H 3/00* | (2022.01) |
| *F24H 15/36* | (2022.01) |
| *F24H 15/128* | (2022.01) |
| *F24H 15/208* | (2022.01) |

(52) U.S. Cl.
CPC .......... *F24H 9/2085* (2013.01); *F24H 3/006* (2013.01); *F24H 15/128* (2022.01); *F24H 15/208* (2022.01); *F24H 15/36* (2022.01); *G05D 23/1852* (2013.01)

(58) Field of Classification Search
CPC .......... F24H 3/006; F24H 9/2085; F24H 9/25; F24H 9/28; F24H 15/00–493; G05D 23/1852; G05D 23/1854; G05D 23/275; G05D 23/2754; G05D 23/08; G05D 23/10
See application file for complete search history.

(56) References Cited

U.S. PATENT DOCUMENTS

| | | | | |
|---|---|---|---|---|
| 2,367,059 | A * | 1/1945 | Rothwell | F23N 5/04 431/70 |
| 2,578,947 | A * | 12/1951 | Rothwell | F23Q 9/12 431/70 |
| 2,862,666 | A * | 12/1958 | Kriechbaum | F24D 5/00 236/11 |
| 2005/0208443 | A1 * | 9/2005 | Bachinski | F23N 5/00 126/512 |

(Continued)

OTHER PUBLICATIONS

JP-3748705-B2 English Machine Translation and Patent Document; Watanabe Yoshihito; Published Feb. 2006 (Year: 2006).*

*Primary Examiner* — Jenna M Hopkins
(74) *Attorney, Agent, or Firm* — CANTOR COLBURN LLP

(57) ABSTRACT

A limit switch assembly including a shape memory member, a furnace system for incorporating the same, and a method for controlling a furnace are provided. The limit switch assembly includes a switch communicatively connected to a control board of a furnace. The switch is configured to send a signal to the control board when actuated. The shape memory member is configured to actuate the switch. The control board, in certain instances, shuts off the furnace and arrests the supply of combustible gas when receiving the signal from the switch. The shape memory member, in certain instances, actuates the switch as a result of being heated.

13 Claims, 5 Drawing Sheets

(56) References Cited

U.S. PATENT DOCUMENTS

| | | | | |
|---|---|---|---|---|
| 2012/0126930 A1* | 5/2012 | Hofsaess | ............... | H01H 37/54 337/362 |
| 2016/0146505 A1* | 5/2016 | Hill | ..................... | F24H 9/2021 361/211 |
| 2017/0067660 A1* | 3/2017 | Dempsey | ................ | F24F 11/30 |

* cited by examiner

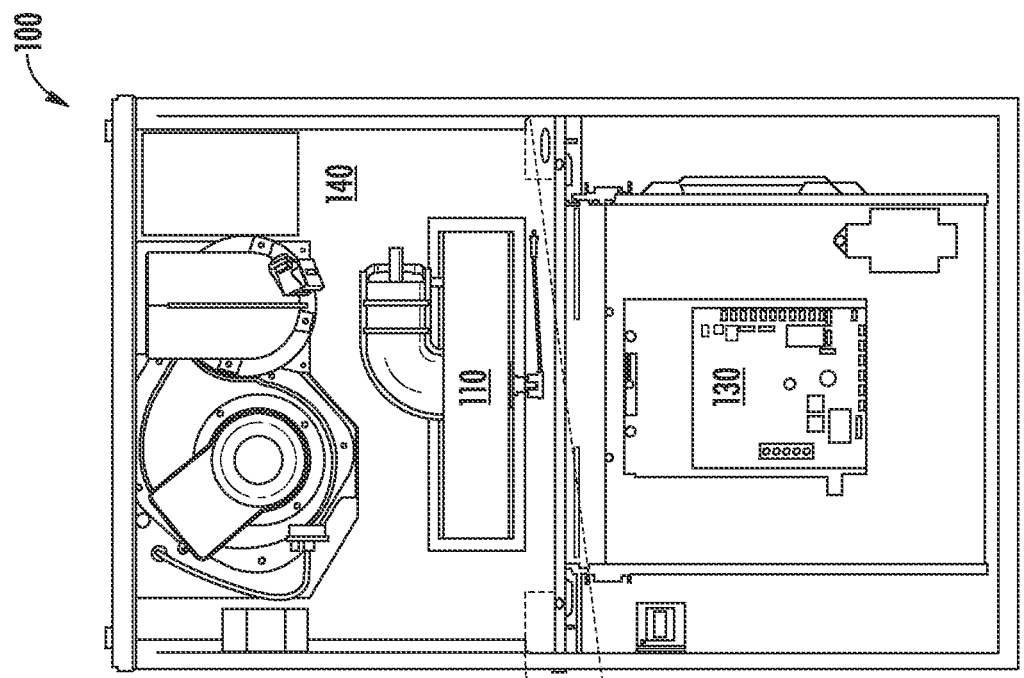
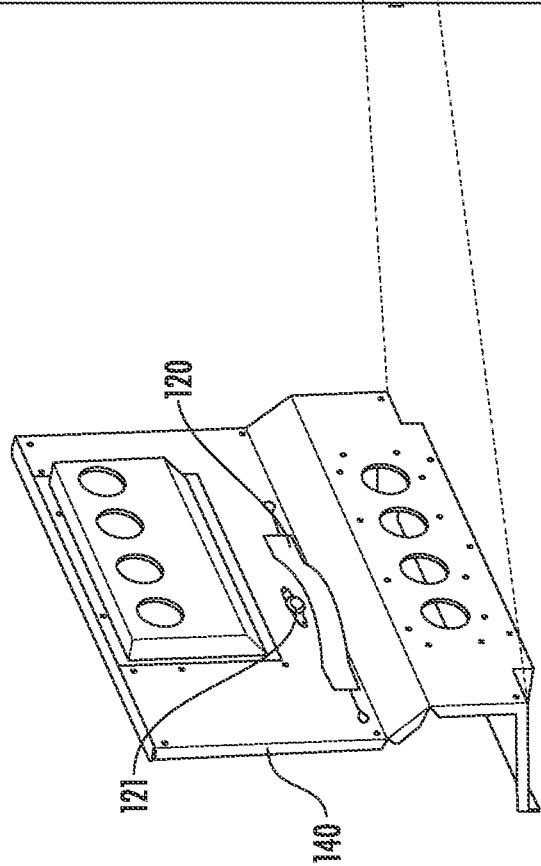
FIG. 4

EFFICIENT LIMIT SWITCH DESIGN AND ITS LOCATION IN A GAS FURNACE

CROSS-REFERENCE TO RELATED APPLICATIONS

This application claims the benefit of India Application No. 202011001832, filed Jan. 15, 2020, the disclosure of which is incorporated herein by reference in its entirety.

BACKGROUND

Modern residential houses in areas with colder climates use gas furnaces to supply heat to the interior space of the home. Furnaces typically contain various components such as a burner, a heat exchanger, a fan, a conduit, and a limit switch. The burner produces heat by burning a fuel source (ex. a combustible gas, such as, natural gas or propane). The heat exchanger transfers heat to the air. The fan directs air through the furnace. The conduit for exhausts flue gas produced by the burning of the fuel source. The limit switch, which is an important safety device, turns off the gas supply to the burners when the air in the system exceeds a threshold temperature.

Conventional limit switches, for example, those shaped like a small metal disc, include a temperature sensor probe mounted to the cell panel of the gas furnace. The probe typically extends through the cell panel wall of the furnace. Typically, these conventional limit switches send a signal to the control board when the temperature exceeds a threshold temperature to prevent possible damages to the furnace. Choosing where to place a conventional limit switch to accurately sense the temperature can be a time consuming process, and often requires extensive testing. Additionally, the placement of a conventional limit switch is quasi-unique, as it varies based upon the particular furnace configuration, heating capacity of the furnace, and/or size of the furnace.

Without correctly placing the limit switch on the furnace the temperature reading of the limit switch could be inaccurate, which could potentially lead to the heating of the air beyond a desired temperature. When accurately placed, limit switches help prevent the furnace from being damaged by turning the furnace and the fuel source off when the air in the system exceeds a threshold temperature. This is important because if the temperature becomes too high the heat exchanger may become overheated, which could potentially cause it to crack.

Accordingly, there remains a need for a limit switch that eliminates the need for minor deviations in placement while also ensuring accurate temperature sensing.

BRIEF DESCRIPTION

According to one embodiment, a furnace system with a burner and a limit switch assembly is provided. The burner is configured to receive and ignite a supply of combustible gas and produce a heated air, the heated air defining a temperature. The limit switch assembly is configured to sense the temperature of the heated air. The limit switch assembly includes a switch and a shape memory member. The switch is communicatively connected to a control board of the furnace, the switch is configured to send a signal to the control board when actuated. The shape memory member configured to actuate the switch.

In accordance with additional or alternative embodiments, the signal is sent by the switch to the control board to shut off the furnace and arrest the supply of combustible gas.

In accordance with additional or alternative embodiments, the shape memory member defines an extended position and a retracted position. In certain instances, the shape memory member actuates the switch when in the extended position.

In accordance with additional or alternative embodiments, the shape memory member is in the extended position when the temperature of the heated air is greater than a threshold.

In accordance with additional or alternative embodiments, the threshold is between 150 and 275° F.

In accordance with additional or alternative embodiments, the limit switch assembly is attached to a cell panel of the furnace system.

According to another aspect of the disclosure, a limit switch assembly configured to sense a temperature is provided. The limit switch assembly includes a switch and a shape memory member. The switch is communicatively connected to a control board of a furnace, the switch configured to send a signal to the control board when actuated. The shape memory member is configured to actuate the switch.

In accordance with additional or alternative embodiments, the shape memory member includes a fixed end and a moveable end. In certain instances, the shape memory member is configured to actuate the switch by extending in the direction of the moveable end when the temperature is greater than a threshold.

In accordance with additional or alternative embodiments, the limit switch assembly further includes a plate. In certain instances, the moveable end of the shape memory member is attached to the plate, for example, with guiding pin.

In accordance with additional or alternative embodiments, the limit switch assembly further includes a bracket configured to guide (ex. using a slot) the plate to actuate the switch when the shape memory member is in an extended position.

In accordance with additional or alternative embodiments, the shape memory member is configured in a helical shape.

In accordance with additional or alternative embodiments, the shape memory member includes a first fixed end and a second fixed end, each of which may include biased helical springs. The shape memory member may be configured in the form of a strip. In certain instances, the shape memory member is configured in an arch when the temperature is less than a threshold. In certain instances, the shape memory member is configured in an approximately flat state when the temperature is greater than a threshold.

In accordance with additional or alternative embodiments, the shape memory member is configured to actuate the switch when in the approximately flat state.

In accordance with additional or alternative embodiments, the shape memory member is made of a shape memory alloy (ex. Nitinol).

According to another aspect of the disclosure, a method for controlling a furnace is provided. The method includes operating a burner, the burner configured to receive and ignite a supply of combustible gas and produce a heated air, the heated air defining a temperature; sensing, with a shape memory member, the temperature of the heated air; and actuating, with the shape memory member, a switch communicatively connected to a control board of a furnace, when the temperature is greater than a threshold.

In accordance with additional or alternative embodiments, the method further includes sending a signal from the switch to the control board, when the switch is actuated, to shut off the furnace.

In accordance with additional or alternative embodiments, the actuating of the switch is caused, at least in part, by the shape memory member extending in the direction of a moveable end of the shape memory member.

In accordance with additional or alternative embodiments, the actuating of the switch is caused, at least in part, by the shape memory member changing from an arch to an approximately flat state.

In accordance with additional or alternative embodiments, the actuating of the switch with the shape memory member is caused, at least in part, by the heating of the shape memory member with the heated air.

In accordance with additional or alternative embodiments, the threshold is between 150 and 275° F.

BRIEF DESCRIPTION OF THE DRAWINGS

The subject matter, which is regarded as the disclosure, is particularly pointed out and distinctly claimed in the claims at the conclusion of the specification. The following descriptions of the drawings should not be considered limiting in any way. With reference to the accompanying drawings, like elements are numbered alike:

FIG. 4 is a perspective view of a furnace system and a second embodiment of a limit switch assembly in accordance with one aspect of the disclosure.

DETAILED DESCRIPTION

Choosing where to place a conventional limit switch can be particularly cumbersome and quasi-unique to the particular furnace. To reduce the amount of time for choosing the particular location of the limit switch while also accurately sensing the temperature, a limit switch assembly with a shape memory member is provided. It is envisioned that the limit switch assembly, as provided, can be used to accurately sense temperature for any furnace. By accurately sensing the temperature, the limit switch assembly helps prevent the furnace from overheating, which, if overheated, could cause the heat exchanger in the furnace to crack. Although the limit switch assembly is capable of being used within any furnace, for purposes of clarity and brevity, the limit switch assembly has only been depicted within a gas furnace assembly.

Figure 1:
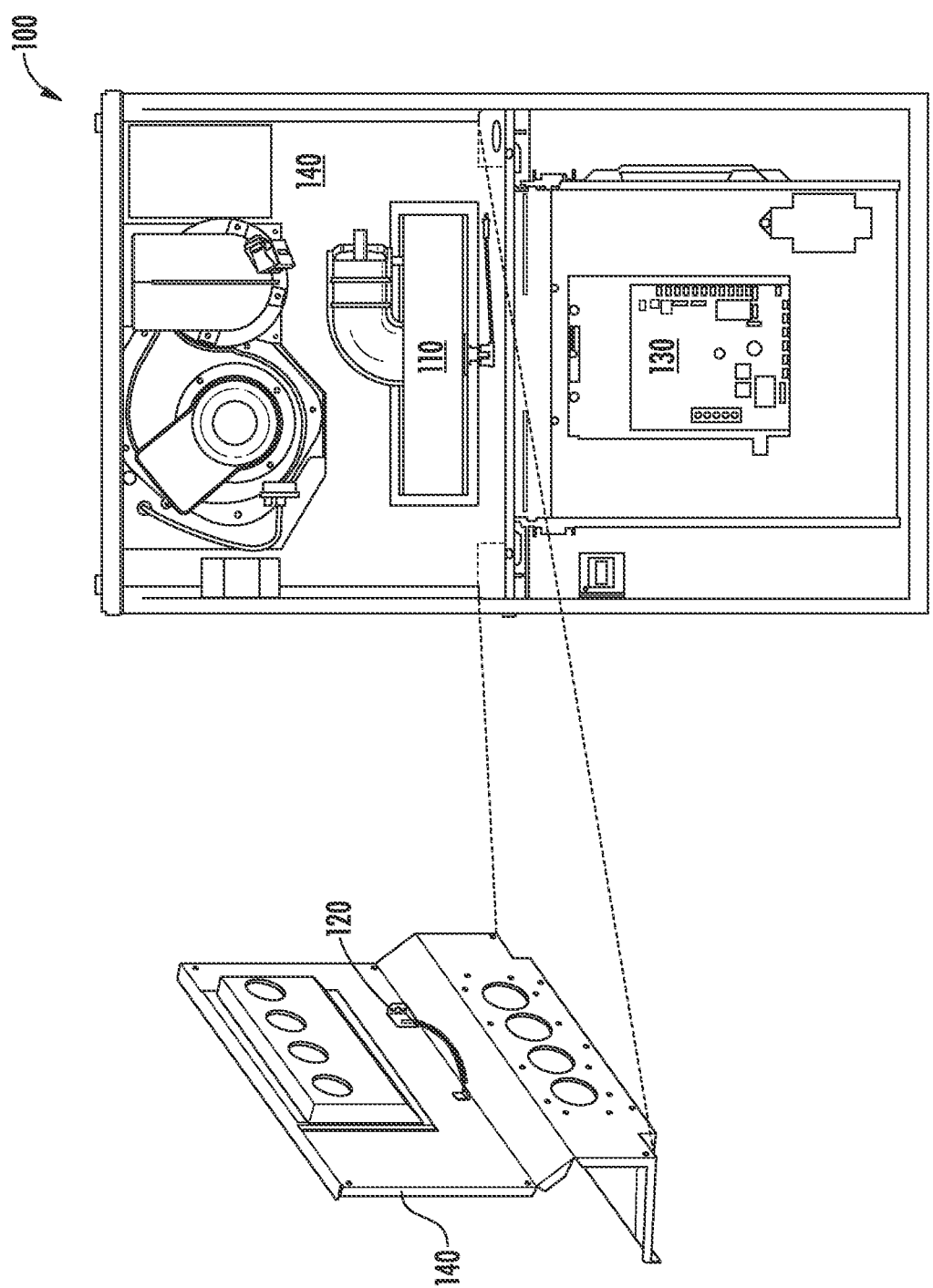
FIG. 1 is a perspective view of a furnace system and a first embodiment of a limit switch assembly in accordance with one aspect of the disclosure.
Figure 2:
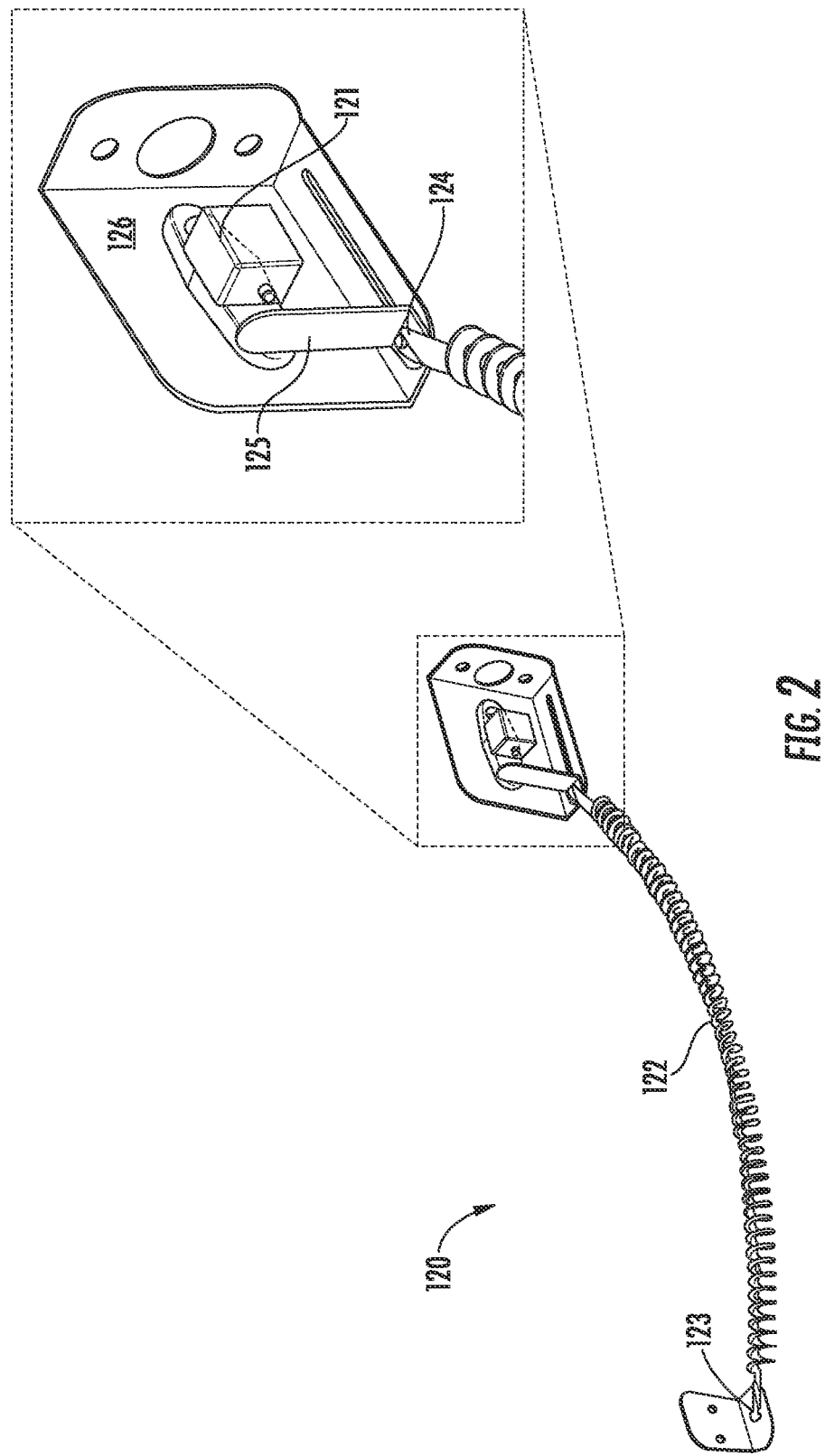
FIG. 2 is a perspective view of the first embodiment of the limit switch assembly, as shown in FIG. 1, with one potential configuration of a switch in accordance with one aspect of the disclosure.
Figure 3:
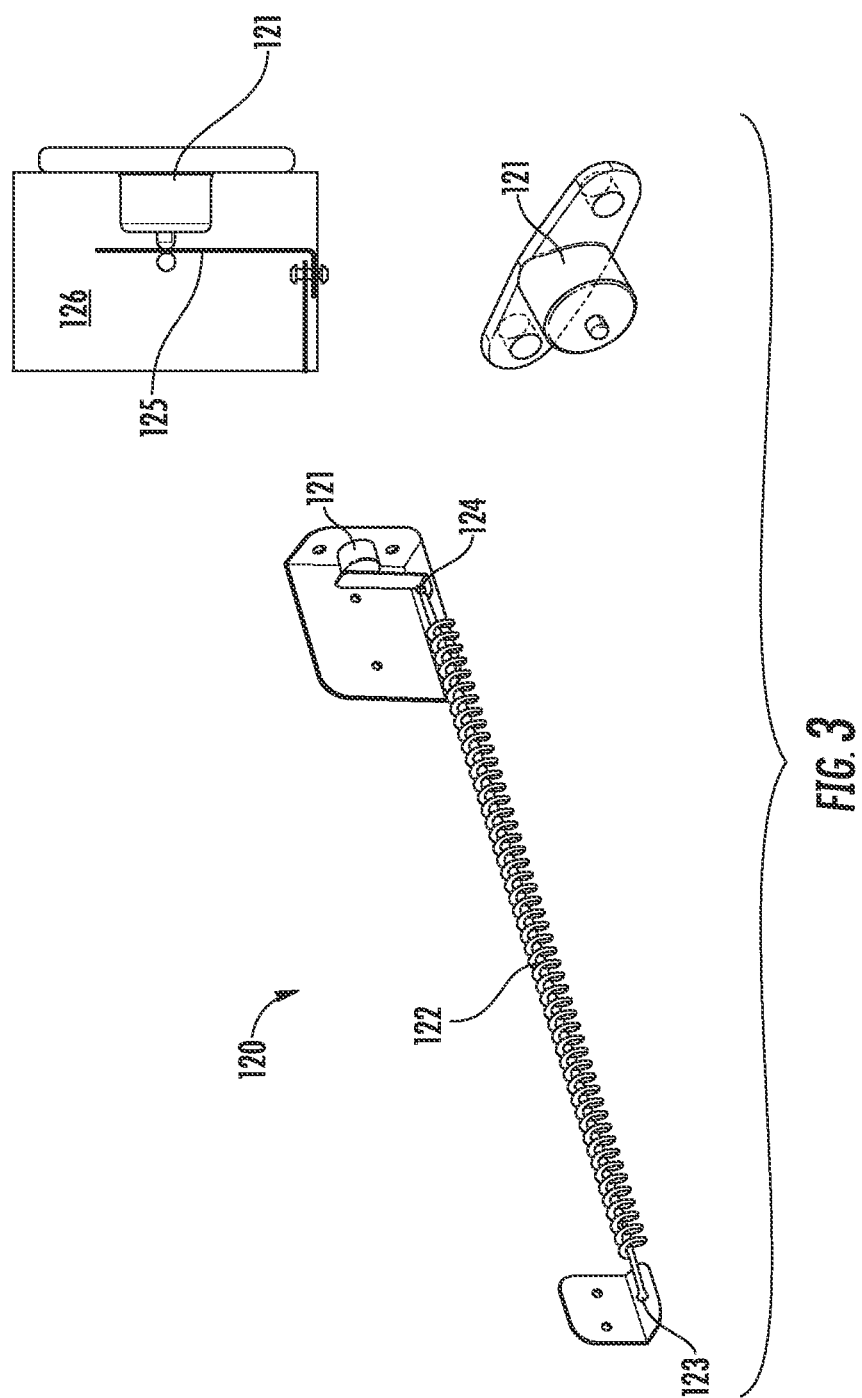
FIG. 3 is a perspective view of the first embodiment of the limit switch assembly, as shown in FIG. 1, with another potential configuration of a switch in accordance with one aspect of the disclosure.

With reference now to the Figures, an exemplary furnace system 100 using a supply of combustible gas as a fuel source is shown in FIG. 1, which incorporates a first embodiment of a limit switch assembly 120, as shown in FIGS. 1-3, on the cell panel 140 of the furnace system 100. The furnace system 100 includes a burner 110 configured to receive and ignite a supply of combustible gas and produce a heated air. The heated air defining a temperature. The combustible gas, in certain instances, is natural gas or propane. The limit switch assembly 120 is configured to sense the temperature of the heated air. In certain instances, although the localized transformation may lead to a temperature gradient, due to conductive heat transfer, the temperature sensed by the limit switch assembly 120 will become uniform across the limit switch assembly 120. As shown in FIGS. 2 and 3, the limit switch assembly 120 includes a switch 121 communicatively connected to a control board 130 of the furnace 100. The control board 130 of the furnace 100 is shown in FIG. 1. The switch 121 is configured to send a signal to the control board 130 when actuated. To actuate the switch 121, the limit switch assembly 120 includes a shape memory member 122. In certain instances, the signal is sent by the switch 121 to the control board 130 to shut off the furnace 100 and the supply of combustible gas.

The shape memory member 122 defines an extended position and a retracted position. The change between a retracted position and an extended position may, in certain instances, be described as a mechanical deformation of the shape memory member 122. A shape memory member 122 in an extended position is shown in FIG. 3. A shape memory member 122 in a retracted position is shown in FIG. 2. In certain instances, the shape memory member 122 actuates the switch 121 when in an extended position. For the shape memory member 122 to go from a retracted position to an extended position, in certain instances, the shape memory member 122 is heated with the heated air. The shape memory member 122, in certain instances, is in an extended position when the temperature of the heated air is greater than a threshold. This threshold may, in certain instances, be dependent on the particular design of the furnace 100. For example, the threshold may be selected based on the number of heat exchanger cells within the furnace 100 and/or size of the furnace 100.

The threshold, in certain instances, is 200° F. For example, at a threshold of 200° F. the shape memory member is in an extended position. In certain instances, the threshold is between 150° F. and 275° F. For example, the threshold may be between 150° F. and 200° F., between 150° F. and 225° F., between 150° F. and 250° F., between 150° F. and 275° F., between 175° F. and 200° F., between 175° F. and 225° F., between 175° F. and 250° F., between 175° F. and 275° F., between 200° F. and 225° F., between 200° F. and 250° F., between 200° F. and 275° F., between 225° F. and 250° F., between 225° F. and 275° F., or between 250° F. and 275° F. To sense the temperature of the heated air, in certain instances, the limit switch assembly 120 is attached to the cell panel 140 of the furnace system 100. For example, the limit switch assembly 120 may be attached to the interior side of the cell panel 140 of the furnace system 100 to sense the temperature of the heated air. In certain instances, the limit switch assembly 120 may be attached to the interior side of the cell panel 140. For example, above or below the burner 110 so as to sense the temperature of the heated air.

The limit switch assembly 120 is designed and configured to sense the temperature of the heated air, and, in certain instances, actuate the switch 121 when the temperature is greater than a threshold. In one embodiment, as shown in FIGS. 2 and 3, the limit switch assembly 120 may be configured to include a fixed end 123 and a moveable end 124. When configured in this manner, in certain instances, the limit switch assembly 120 is configured to actuate the switch 121 by extending in the direction of the moveable end 124 when the temperature is greater than a threshold. In certain instances, the moveable end 124 of the shape memory member 122 is attached to a plate 125. Although described to able to attach to a plate 125, it is envisioned that the moveable end 124 of the shape memory member 122 may, in certain instances, be attached to any mechanism that enables the shape memory member 122 to actuate the switch 121, for example a guide roller and/or a spring. The limit switch assembly 120, in certain instances, includes a bracket 126 configured to guide the plate 125 to actuate the switch 121 when the shape memory member 122 is in an extended position, as shown in FIG. 3. As shown in FIGS. 1-3, the shape memory member 122, in certain instances, is configured in a helical shape. The shape memory member 122 may, in certain instances, be configured in any shape capable of deforming that enables the shape memory member 122 to actuate the switch 121, for example, the shape memory member 122 may be configured in a straight wire.

Figure 5:
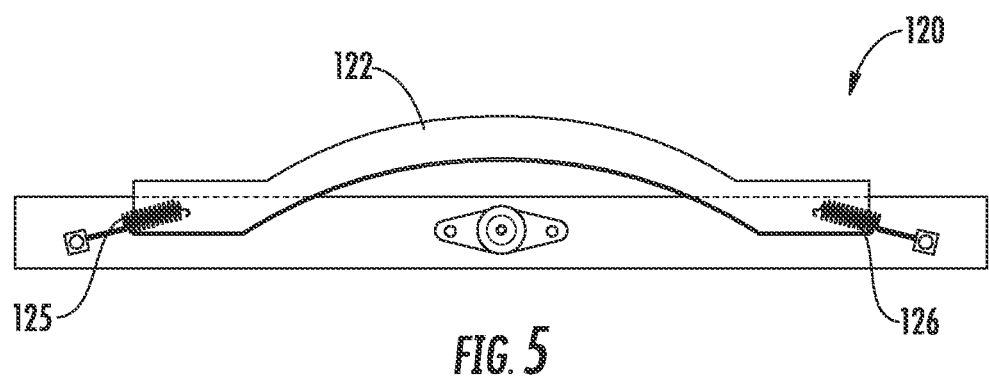
FIG. 5 is a perspective view of the second embodiment of the limit switch assembly, as shown in FIG. 4, in a retracted position in accordance with one aspect of the disclosure.
Figure 6:
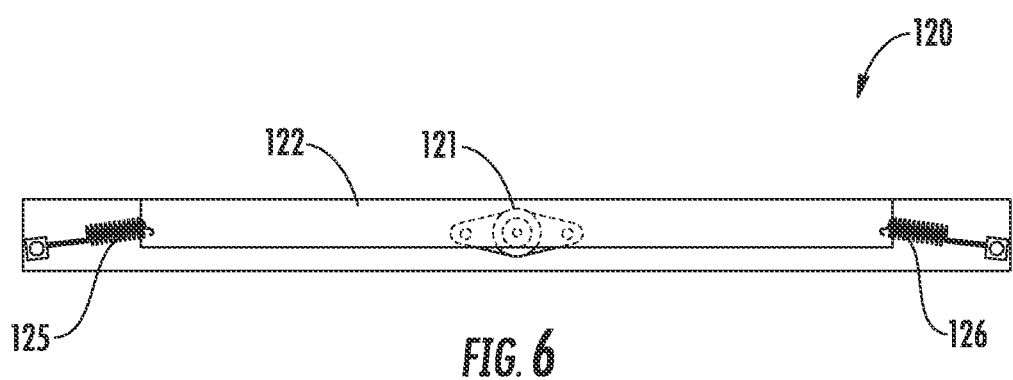
FIG. 6 is a perspective view of the second embodiment of the limit switch assembly, as shown in FIG. 4, in an extended position in accordance with one aspect of the disclosure.

In another embodiment, as shown in FIGS. 4-6, the shape memory member 122, of the limit switch assembly 120, include a first fixed end 125 and a second fixed end 126. The shape memory member 122, when configured in this manner, may be in an arch, as shown in FIG. 5, when the temperature is less than a threshold, and may be in an approximately flat state, as shown in FIG. 6, when the temperature is greater than a threshold. In certain instances, the shape memory member 122 is configured to actuate the switch 121 when in the approximately flat state.

Regardless of the particular configuration of the limit switch assembly 120, in certain instances, the shape memory member 122 is made of a shape memory alloy (SMA), for example, Nitinol. A shape memory alloy is an alloy that can be deformed due to a change in temperature. For example, the SMA may be in one shape when heated, but return to its pre-deformed ("remembered") shape when cooled. A SMA may, in certain instances, be described as any material capable of thermoelastic martensitic reversion, also called reversible shape memory. In certain instances, the shape memory alloy is copper-aluminum-nickel or nickel-titanium (NiTi, also known as "Nitinol"). In certain instances, the SMA is iron-based or copper-based, such as Fe—Mn—Si, Cu—Zn—Al, or Cu—Al—Ni. However, in certain instances, the SMA may be Ag—Cd, Au—Cd, Co—Ni—Al, Co—Ni—Ga, Cu—Al—Be—X, Cu—Al—Ni, Cu—Al—Ni—Hf, Cu—Sn, Fe—Pt, Mn—Cu, Ni—Fe—Ga, Ni—Ti—Hf, Ni—Ti—Pd, Ni—Mn—Ga, or Ti—Nb. Each of the different potential SMAs may have different temperatures at which they either retract or extend. As such, in certain instances, the SMA is selected based upon the threshold at which the limit switch assembly 120 should actuate the switch 121. For example, when the threshold is 200° F., the shape memory member 122 may be made of Nitinol so as to actuate the switch 121 when the temperature is greater than 200° F.

The switch 121 of the limit switch assembly 120 may be configured in a plethora of different positions, so as to enable the shape memory member 122 to actuate the switch 121. As shown in FIG. 2, in certain instances, the switch 121 is configured in a horizontal manner so that the shape memory member 122 actuates the switch 121 when in an extended position. As shown in FIG. 3, in certain instances, the switch 121 is configured in a vertical manner so that the shape memory member 122 actuates the switch 121 when in an extended position. Regardless of the configuration of the switch 121, in certain instances, the shape memory member 122 actuates the switch 121 due to, at least in part, the shape memory member 122 being heated with the heated air. In certain instances, the design and configuration of the components of the limit switch assembly 120 enable accurate temperature sensing so that the furnace 100 can be controlled effectively. For example, ensuring the furnace 100 turns off before the temperature becomes too high.

The method for controlling a furnace may be done, for example, using either exemplary limit switch assembly 120, as shown in FIGS. 1-3 and FIGS. 4-6. The method provides for the operating of a burner 110, the burner 110 configured to receive and ignite a supply of combustible gas and produce a heated air, the heated air defining a temperature. The method provides for the sensing of the temperature of the heated air with a shape memory member 122. The method provides for the actuating, with the shape memory member 122, a switch 121 communicatively connected to a control board 130 of a furnace 100, when the temperature is greater than a threshold. In certain instances, the method further includes sending a signal from the switch to the control board 130, when the switch 121 is actuated, to shut off the furnace. The actuating of the switch 121, in certain instances, is caused, at least in part, by the shape memory member 122 extending in the direction of a moveable end 124 of the shape memory member 122. The actuating of the switch 121, in certain instances, is caused, at least in part, by the heating of the shape memory member 122 with the heated air. In various instances, the shape memory member 122 actuates the switch when the temperature exceeds a threshold (ex. 200° F.).

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A furnace system, comprising:
   a burner configured to receive and ignite a supply of combustible gas and produce a heated air, the heated air defining a temperature; and
   a limit switch assembly configured to sense the temperature of the heated air, the limit switch assembly comprising:
   a switch communicatively connected to a control board of the furnace system, the switch configured to send a signal to the control board when actuated; and
   a shape memory member having a first fixed end and an opposite, second fixed end, the switch being arranged within a plane containing the first fixed end and the second fixed end, the shape memory member being transformable between a retracted position and an extended position in response to the temperature of the heated air exceeding a threshold, wherein in the extended position, the shape memory member is directly engaged with the switch.

2. The furnace system of claim 1, wherein the signal is sent by the switch to the control board to shut off the furnace and arrest the supply of combustible gas.

3. The furnace system of claim 1, wherein the threshold is between 150 and 275° F.

4. The furnace system of claim 1, wherein the limit switch assembly is attached to a cell panel of the furnace system.

5. A limit switch assembly configured to sense a temperature, the limit switch assembly comprising:
- a switch communicatively connected to a control board of a furnace, the switch configured to send a signal to the control board when actuated; and
- a shape memory member having a first fixed end and an opposite, second fixed end, the switch being arranged within a plane containing the first fixed end and the second fixed end, the shape memory member being transformable between a retracted position and an extended position in response to the temperature exceeding a threshold, wherein in the extended position, the shape memory member is directly engaged with the switch.

6. The limit switch assembly of claim 5, wherein the shape memory member is configured in an arch when the temperature is less than a threshold and the shape memory member is configured in an approximately flat state when the temperature is greater than a threshold.

7. The limit switch assembly of claim 6, wherein the shape memory member is configured to actuate the switch when in the approximately flat state.

8. The limit switch assembly of claim 5, wherein the shape memory member is comprised of Nitinol.

9. A method for controlling a furnace, the method comprising:
- operating a burner, the burner configured to receive and ignite a supply of combustible gas and produce a heated air, the heated air defining a temperature;
- sensing, with a shape memory member, the temperature of the heated air, the shape memory member having a first fixed end and an opposite, second fixed end; and
- actuating, with the shape memory member, a switch communicatively connected to a control board of the furnace, in response to the temperature being greater than a threshold, the switch being arranged within a plane containing the first fixed end and the second fixed end, wherein actuating the switch further comprises transforming the shape memory member from a retracted position to an extended position, and in the extended position, the shape memory member directly engages the switch.

10. The method of claim 9, further comprising sending a signal from the switch to the control board, when the switch is actuated, to shut off the furnace.

11. The method of claim 9, wherein the actuating of the switch is caused, at least in part, by the shape memory member changing from an arch to an approximately flat state.

12. The method of claim 9, wherein the actuating of the switch with the shape memory member is caused, at least in part, by the heating of the shape memory member with the heated air.

13. The method of claim 9, wherein the threshold is between 150 and 275° F.

* * * * *